United States Patent [19]

Spletzer

[11] 4,297,682
[45] Oct. 27, 1981

[54] FLEXIBLE CONVEX DIAPHRAGM SOUND REPRODUCING DEVICE

[75] Inventor: Barry L. Spletzer, Fremont, Mich.

[73] Assignee: Gerber Products Company, Fremont, Mich.

[21] Appl. No.: 110,160

[22] Filed: Jan. 7, 1980

[51] Int. Cl.³ .............................................. G08B 3/00
[52] U.S. Cl. ............................ 340/384 E; 340/384R; 340/388
[58] Field of Search ............... 340/384 E, 384 R, 388

[56] References Cited

U.S. PATENT DOCUMENTS 4,225,853  9/1980  Hamilton ..................... 340/384 E

*Primary Examiner*—Harold I. Pitts
*Attorney, Agent, or Firm*—Townsend andd Townsend

[57] ABSTRACT

A device designed to duplicate the clicking sound made when a convex, thin, flexible diaphragm, such as a raised safety dome on a hermetically sealed food container, is flexed is disclosed. In canning food products, such as baby food, there is a partial vacuum created within the container. If the seal on the container or jar is not tight, the vacuum will be lost. To check for this vacuum, baby food jar lids generally have a safety dome which will be depressed inwardly only if the vacuum is present. Jars, or even boxes of jars, can be subjected to a positive external pressure by a device called a dud detector. If a clicking sound is heard, a dud (a jar without enough vacuum to keep the dome depressed) is present. The dud detector senses this clicking noise and the jar or jars are rejected. The device consists of a flexible metal plate clamped adjacent to one end of an electromagnetic coil. The coil is energized by an SCR controlled circuit which releases a charge stored in a capacitor through the coil. The rapidly changing electromagnetic field induces a force which deflects the flexible plate. A sound is produced which mimics that produced when the safety dome of a food container is depressed. The sensitivity of and functioning of the dud detector thus can be properly adjusted.

9 Claims, 4 Drawing Figures

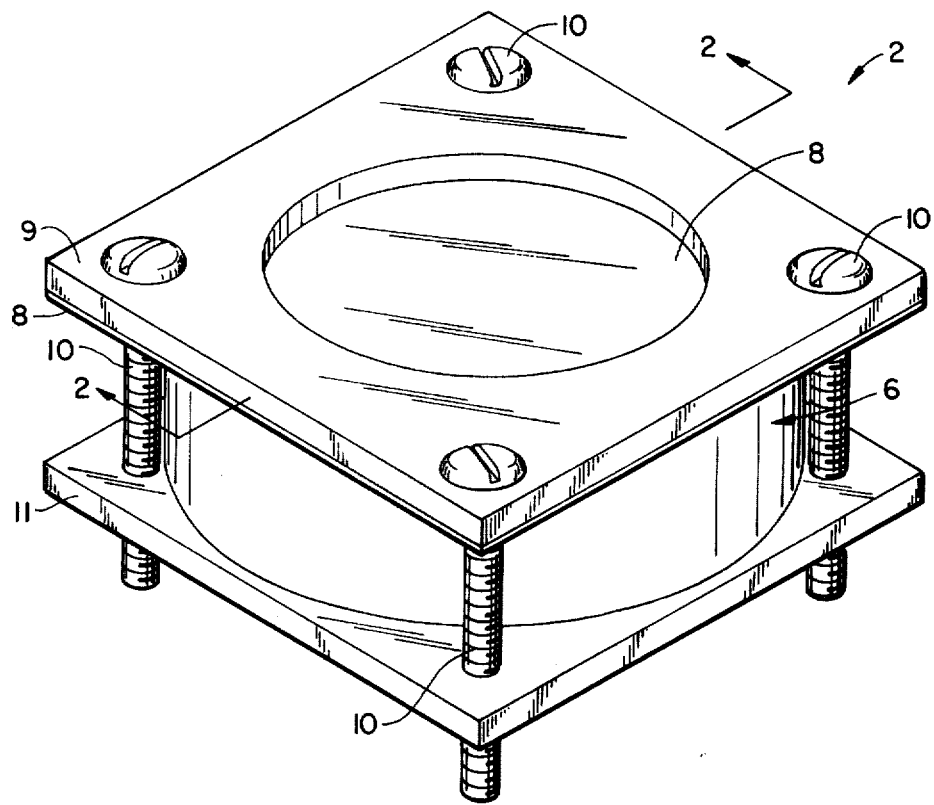
FIG._1.
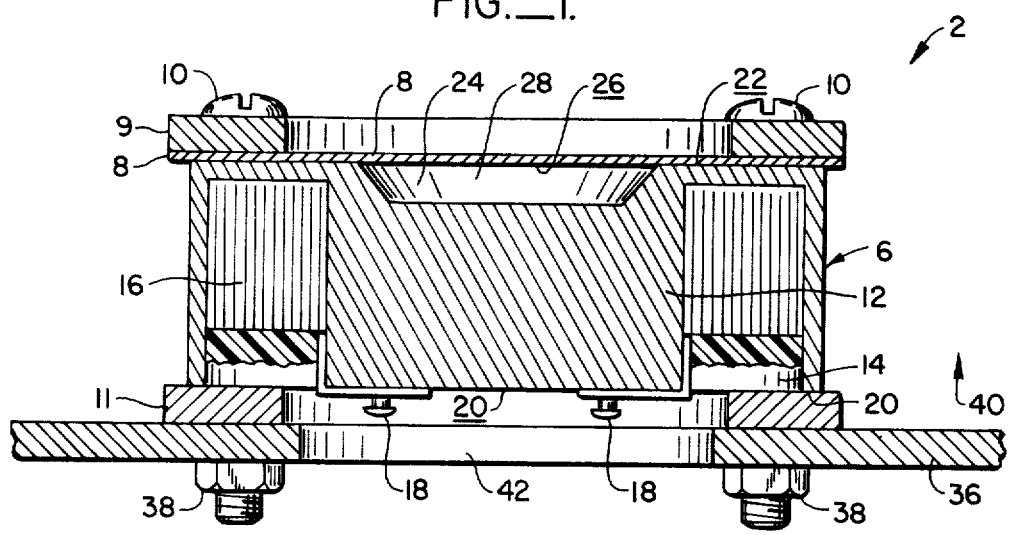
FIG._2.

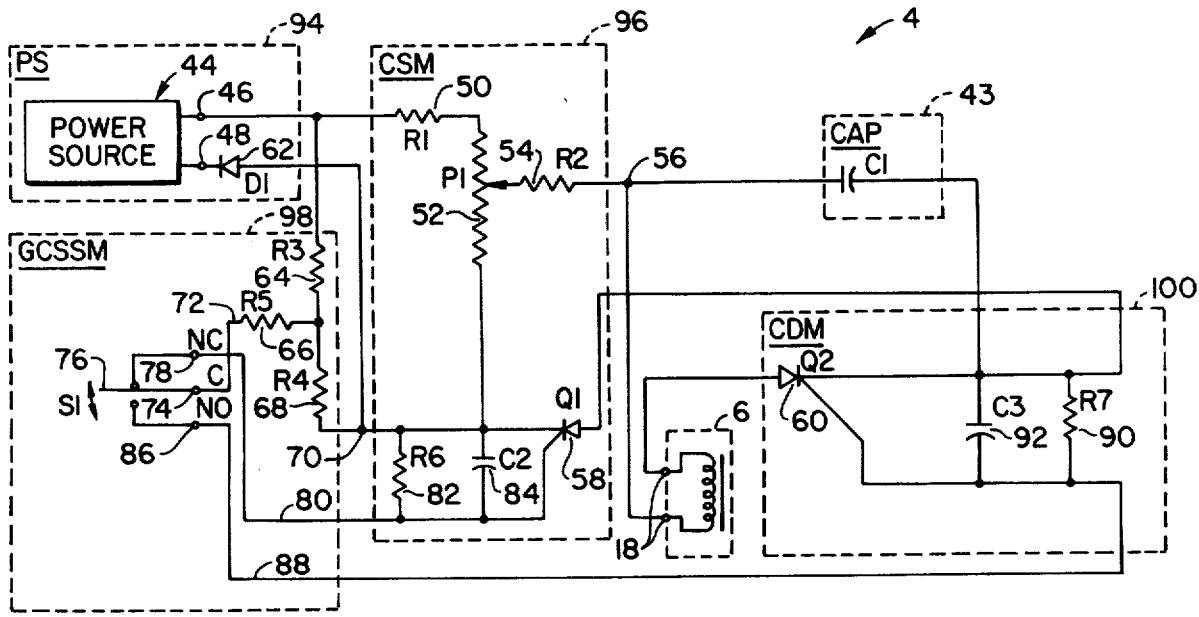
FIG._3.
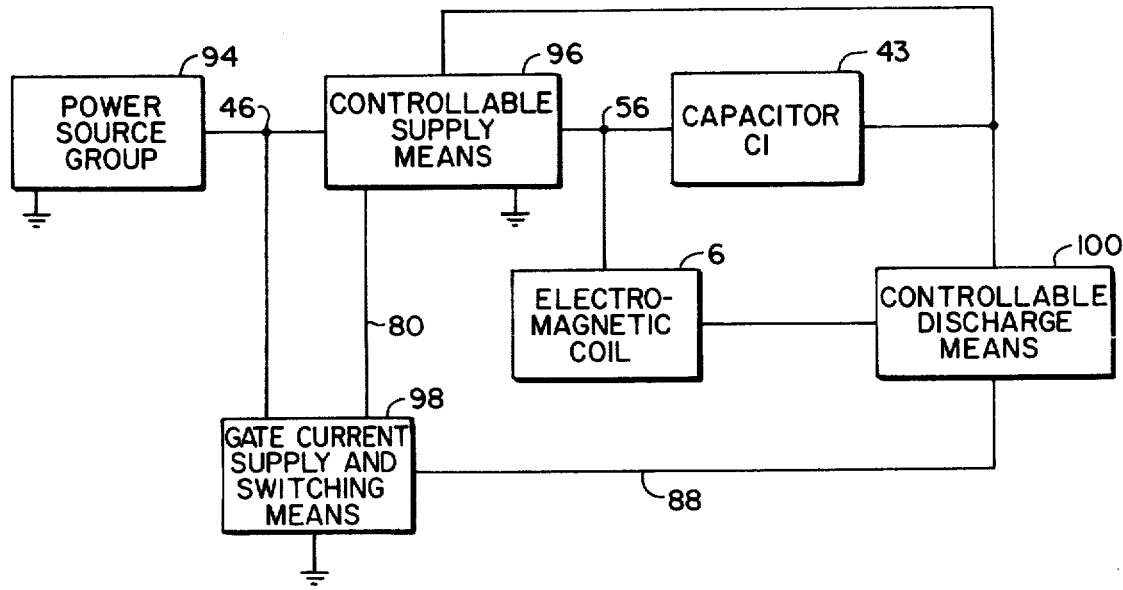
FIG._4.

FLEXIBLE CONVEX DIAPHRAGM SOUND REPRODUCING DEVICE

This invention relates to sound-reproducing devices, particularly to one designed to duplicate the clicking sound made when a convex, thin, flexible diaphragm is flexed. Such a device has particular utility for reproducing the distincitive clicking sound made by a safety button on the top of a hermetically sealed container as it is depressed.

BACKGROUND OF THE INVENTION

So-called dud detector devices have been developed for testing the hermetic vacuum seal on containers, particularly baby food jars. These containers typically have a raised safety button or convex dome which inverts itself into a concave configuration when there exists the normal partial vacuum within the container. If such vacuum is lost, the button returns to its unstressed convex shape. The resulting container with an insufficient vacuum is referred to by the food packing industry as a "dud." Devices have been developed to detect duds by subjecting entire cases of such filled food container to a pressure in excess of atmospheric. If any duds are present, the pressure causes the safety button to flip from a convex to a concave configuration, thereby emitting a distinctive click. The dud detector apparatus is designed to sense such a click provide an indication to the operator of the existence of a dud. The case can then be removed for further inspection.

It has been found that the sensitivity of the dud detecting apparatus is quite critical. If the dud detector is too sensitive, extraneous background noise may give a false dud indication. This results in the needless expenditure of time and money of rejecting good containers. If the sensitivity of the dud detecting apparatus is too low, some duds may not be detected. This prospect is totally unacceptable for food containers, especially baby food containers. Therefore, it is apparent that the sensitivity of such dud detector devices is critical. Apparatus to reproduce the noise made by the safety button when flipped, thus enabling these dud detectors to be standardized, is needed.

SUMMARY OF INVENTION

The present invention concerns devices for duplicating the sound made when a thin, convex, flexible diaphragm is flexed. In particular, the device disclosed is used in standardizing dud detectors by duplicating the distinctive clicking sound made when a dud is subjected to external pressure within a dud detector. The sensitivity of the dud detector can thus be properly adjusted.

The device consists of an electromagnetic coil placed adjacent to a thin flexible metal plate. The upper surface of the coil has a shallow circular depression formed centrally within it. The plate is clamped to the upper surface of the coil by a hold-down plate. The hold-down plate has a circular hole formed within it. The circular depression and circular hole allow the flexible plate to flex. The electromagnetic coil is secured by bolts between the flexible plate on one end and a gasket on the other. This combination of gasket, electromagnetic coil, flexible plate, hold-down plate, and the securing bolts is hereinafter referred to as an auditor coil.

The auditor coil is energized by an adjustable energizing circuit. The energizing circuit has six main component groupings. A power source group is electrically connected to a controllable supply means, such means coupled to a driving capacitor for charging such capacitor. The capacitor is controllably discharged through the electromagnetic coil by a controllable discharge means. Activation of the controllable supply means and the controllable discharge means is by way of a gate current supply and switching means. In the preferred embodiment the circuit uses a combination of electrical components, including two SCR's, for controlling the sudden release of an electric charge stored in a capacitor to the electromagnetic coil, thereby producing a rapidly changing electromagnetic field, inducing a sudden force in the clamped flexible metal plate. This sudden force causes the plate to deflect and the constrained movement induces vibrations at the fundamental frequency of the plate thereby producing a distinctive clicking sound similar to that of a depressed safety dome.

SCR's are used, rather than mechanical switches, to minimize electromagnetic emissions. Such emissions can affect the sensitive dud detector amplifier.

The device allows the operator of a dud detector, such as one disclosed by either U.S. Pat. No. 3,650,145 or U.S. Pat. No. 3,513,689, to quickly and accurately test and adjust the detector. This insures that no duds will pass through the apparatus without being undetected due to an inoperative detector or because the sensitivity is incorrectly adjusted. In the food industry, especially the baby food industry, the assured reliability of such test equipment is of paramount importance.

BRIEF DESCRIPTION OF THE DRAWINGS

FIG. 1 illustrates the auditor coil of the invention in an isometric view.

FIG. 2 is a cross-sectional view of the auditor coil shown mounted to a wall of dud detector.

FIG. 3 is a schematic diagram of the energizing circuit.

FIG. 4 is a block diagram of the main electrical component groupings.

DETAILED DESCRIPTION OF THE PREFERRED EMBODIMENT

The invention comprises two main elements: an auditor coil 2 and an energizing circuit 4. The structure of the auditor coil 2 will be described first, then the energizing circuit 4 will be discussed. Finally the operation of the invention will be described.

As seen in FIG. 1, auditor coil 2 comprises generally an electromagnetic coil 6, a flexible plate 8, a holddown plate 9, bolts 10, and a gasket 11.

Electromagnetic coil 6, as best seen in FIG. 2, has a cylindrical core 12, made of a non-conducting material, and a relatively deep annular channel 14 formed coaxially within core 12. Within channel 14 an insulated conductor 16 is wrapped in a circular fashion. Two terminals 18, electrically connected to the ends of conductor 16, are mounted to the lower surface 20 of core 12. The upper surface 22 of core 12 is generally flat, with a shallow circular depression 24 formed centrally within core 12 at upper surface 22. Depression 28 is approximately 1 inch in diameter. A 0.04 ohm, 300 millihenry coil of this type procured from Benthos, Incorporated has proven effective.

Flexible plate 8 is positioned centrally over upper surface 22. Core 12, being made of a thermosetting phenolformaldehyde marketed by Westinghouse Electric Corporation under the trade name of MICARTA, has proven to provide proper damping to plate 8. The lower face 26 of plate 8 rests against surface 22 thereby creating a circular chamber 28 defined by circular depression 24 and a portion of lower face 26 which is above depression 24. Plate 8 is, in this preferred embodiment, a 2.25 inch square sheet of steel 0.0235 inch in thickness.

Positioned above and adjacent to plate 8 is rectangular hold-down plate 9. Plate 9 has formed centrally within it a circular void 1.5 inches in diameter. Plate 9, made of steel in this preferred embodiment, is 2.25 inches square, and is 0.125 inch thick.

Adjacent to lower surface 20 is a 2.25 inch square, 0.125 inch thick gasket 11. Gasket 11 has a 1.5 circular hole formed centrally within it and into which leads 18 extend. Gasket 11 can be made of any suitable sealing material, such as polyurethane, Shore durometer 60A.

Gasket 11, hold-down plate 9, and flexible plate 8 are held in place by means of bolts 10. Bolts 10 are shown passing through colinear holes formed within gasket 11, plate 9 and plate 8 near the corners of each. Bolts 10 also extend through like holes formed within a wall 36 of a dud detector and are held in place by nuts 38. Between flexible plate 8 and gasket 11, core 12 of electromagnetic coil 6 is fixed in place. Gasket 11 seals the interior 40 of the dud detector from leaking through an opening 42 formed within wall 36, such opening formed to allow electrical connection to terminals 18.

It should be noted that the materials chosen may be varied to meet the specific requirements of the user. Flexible plate 8 may be made of other electrically conductive material and may be of a different thickness. The dimensions may be changed. Changes such as these may be made to allow the device to match the desired characteristics, such as frequency, loudness, decay rate, and harmonics, of the subject sound. In particular, a different electromagnetic coil 6 may be chosen with different characteristics. Such a change would often only require a change in the size of a discharge capacitor 43 in energizing circuit 4; circuit 4 is discussed below.

Electromagnetic coil 6 is energized by the rapid discharge of capacitor 43, designated C1, through coil 6.

Referring to FIG. 3, a power source 44 is shown having two terminals 46, 48. Terminal 46 communicates through a resistor 50, designated R1, to the input of a potentiometer 52, designated P1, and then out through wiper arm of potentiometer 52 to the first terminal of a resistor 54, designated R2. The second terminal of resistor 54 communicates with a junction 56. Junction 56 communicates with the first terminal of capacitor 43 whereby capacitor 43 is charged. The second terminal of capacitor 43 communicates with the anode of an SCR 58, designated Q1 and the cathode of an SCR 60, designated Q2. The cathode of SCR 58 communicates with the output of potentiometer 52 and also with the anode of a diode 62, designated D1. The cathode of diode 62 is coupled to terminal 48.

Junction 56 also communicates with coil 6 through terminals 18. Coil 6 lies in series between junction 56 and the anode of SCR 60.

Terminal 46 also communicates with the first terminal of a resistor 64, designated R3. The second terminal of resistor R3 is coupled to the first terminals of both a resistor 66, designated R5, and a resistor 68, designated R4. The second terminal of resistor 68 communicates with a junction 70, which junction communicates with cathode of SCR 58 and anode of diode 62. The second terminal of resistor 66 communicates with a conductor 72. Conductor 72 communicates with a common terminal 74, designated C, of a pushbutton switch 76, designated S1. Switch 76 is biased to electrically couple common terminal 74 to a normally closed terminal 78, designated NC. Normally closed terminal 78 is connected to a conductor 80. Conductor 80 communicates with the first terminal of a resistor 82, designated R6, and a capacitor 84, designated C2, and also with the gate of SCR 58. The second terminals of resistor 82 and capacitor 84 are both connected to communicate with junction 70.

Pushbutton switch 76 has a normally open terminal 86, designated NO, which is coupled to a conductor 88. Conductor 88 communicates with the first terminal of a resistor 90, designated R7, the first terminal of a capacitor 92, and the gate of SCR 60. The second terminals of resistor 90 and capacitor 92 communicate with a point on the circuit which is common to the cathode of SCR 60, the anode of SCR 58 and the second terminal of capacitor C1.

The device operates as follows. Capacitor 43 is charged through the application of a current through terminal 46, resistor 50, through a portion of potentiometer 52, through resistor 54 to capacitor 43. The charging circuit is completed through SCR 58, through diode 62 to terminal 48. In the preferred embodiment power source 44 provides 110 VAC to terminals 46, 48. It is readily apparent that diode 62 supplies half-wave rectification for the circuit. Resistors 82 and 90 and capacitors 84 and 92 are used to prevent unreliable triggering of the SCR's 58 and 60 caused by current leakage through the SCR's. A partially rectified direct current source such that the input current periodically reaches zero is needed to allow the SCR's to return to an off (non-conducting) condition after the gate current is removed.

The level of charging of capacitor 43 is adjusted by means of the potentiometer 52 setting. Resistors 64, 66, and 68 act as a voltage divider for supplying gate current to the SCR's 58 and 60. Switch 76 is biased to normally supply gate current to SCR 58. This allows charging of capacitor 43. When switch 76 is depressed, the gate current to SCR 58 is cut off thus stopping any current flow through SCR 58. When normally open terminal 86 is closed, gate current is supplied SCR 60. This provides a virtually resistance-free path for capacitor 43 to dump its charge through electromagnetic coil 6.

The sudden rush of current through coil 6 creates an electromagnetic field which exerts a force on flexible plate 8 causing plate to deflect and vibrate thus producing the distinctive sound desired. By adjusting potentiometer 52, the loudness of the sound produced can be adjusted.

Switch 76 is then released thereby cutting off the gate current to SCR 60. As a result SCR 60 blocks the passage of current through it in either direction, anode to cathode or cathode to anode, thus halting the flow of current through coil 6.

In order to better understand the invention, a block diagram of the main groupings of components are shown at FIG. 4. A power source group 94 provides electric current to both a controllable supply means 96 and a gate current supply and switching means 98 through terminal 46. Supply means 96 charges capacitor 43 via junction 56. Discharge of capacitor 43 through coil 6 is accomplished through controllable discharge means 100. Gate current means 98 supplies the necessary current to either the supply means 96 or discharge means 100 through conductors 80 and 88 respectively.

In practice, the loudness of the sound produced by the invention is adjusted by means of a previously calibrated mechanical device after being mounted to the dud detector. Then, with the device mounted to a wall of the dud detector, the sensitivity of the dud detecting unit is adjusted so that it properly signals the presence of a dud when the invention is activated reproducing the distinctive clicking sound. The operator need merely press switch 76 anytime during operation of the dud detector to determine if the dud detector is operating properly.

The following are suitable components values for use in the above-described circuit.

| Component | Value |
|---|---|
| R1 (50) | 1 k ohm, 8 w |
| R2 (54) | 1 k ohm, 8 w |
| R3 (64) | 100 k ohm, ¼ w |
| R4 (68) | 10 k ohm, ¼ w |
| R5 (66) | 3.3 k ohm, ¼ w |
| R6 (82) | 1 k ohm, ¼ w |
| R7 (90) | 1 k ohm, ¼ w |
| D1 (62) | 1N5061 |
| C1 (43) | 100 microfarad, 250 V |
| C2 (84) | .1 microfarad, 200 V |
| C3 (92) | .1 microfarad, 200 V |
| Q1 (58) | C106A1 |
| Q2 (60) | C106A1 |
| P1 (52) | 0–20 k ohm, 50 w |

The substitution of components with different values may be made without deviating from the invention. In particular, the size of capacitor 43 may be changed to match a change in flexible plate 8 thickness or material or a change in the choice of electromagnetic coil 6.

Thus, although the best mode contemplated for carrying out the present invention has been herein shown and described, it will be apparent that modification and variation may be made without departing from what is regarded to be the subject of the invention.

What is claimed is:

1. Apparatus for reproducing the sound produced when a convex, thin, flexible diaphragm is flexed comprising:

an electromagnetic coil;
   means for mounting a relatively thin electrically conductive flexible plate adjacent to one end of said coil;
   said coil and said mounting means configured to allow said flexible plate to flex; and
   means, electrically coupled to said coil and to a power source having a first terminal and a second terminal, for selectively energizing said coil whereby said flexible plate deflects and vibrates thereby reproducing said sound.

2. Apparatus of a type for reproducing the sound produced when the convex, thin, flexible diaphragm included on hermetically sealed containers is flexed, for use in standardizing dud detectors comprising:

an electromagnetic coil;
   means for mounting a relatively thin electrically conductive flexible plate adjacent to one end of said coil;
   said coil and said mounting means configured to allow said flexible plate to flex; and
   means, electrically coupled to said coil and to a power source having a first terminal and a second terminal, for selectively energizing said coil whereby said flexible plate deflects and vibrates thereby reproducing said sound.

3. The device of claims 1 or 2 wherein said flexible plate is steel.

4. The device of claims 1 or 2 wherein said energizing means further comprises:

a driving capacitor electrically coupled to said coil;
   means, electrically coupled to said driving capacitor and said power source, for controllably supplying said capacitor with a chosen charge from said power source;
   means, electrically coupled to said driving capacitor and said coil, for controllably discharging said capacitor through said electromagnetic coil; and
   a gate current supply and switching means electrically coupled to the power supply, the controllable supply means and the controllable discharge means.

5. The device of claim 4 wherein said controllable supply means further comprises:

a first variable resistor in series between said capacitor and said first terminal of said power source;
   a second variable resistor in parallel with said capacitor, said second variable resistor coupled to said first variable resistor;
   a first controlled rectifier, in series with said second terminal, having a first anode, a first cathode, and a first gate, said first gate being selectively supplied with gate current from said gate current supply and switching means.

6. The device of claim 4 wherein said controllable discharge means further comprises:

a second controlled rectifier in series with said electromagnetic coil having a second anode, a second cathode, and a second gate, said second gate being selectively supplied with gate current from said gate current supply and switching means.

7. The device of claims 1 or 2 wherein said power source is a half-wave rectified power source.

8. The device of claim 4 wherein said gate current supply and switching means is biased to supply gate current to the controllable supply means.

9. The device of claim 6 wherein said electromagnetic coil has an inductance of approximately 300 millihenrys and a resistance of approximately 0.04 ohm.

* * * * *